United States Patent [19]

Gibb et al.

[11] Patent Number: 4,471,979
[45] Date of Patent: Sep. 18, 1984

[54] QUICK-CONNECT COUPLING FOR THIN-WALLED PIPES

[75] Inventors: John Gibb, Bolton; Jozsef Horvath, Islington, both of Canada

[73] Assignee: Victaulic Company of Canada Limited, Ontario, Canada

[21] Appl. No.: 358,361

[22] Filed: Mar. 15, 1982

[51] Int. Cl.³ .................. F16L 17/00; F16L 21/00; F16L 23/00

[52] U.S. Cl. .................. 285/373; 285/112; 285/419; 285/415; 285/411; 285/367

[58] Field of Search .............. 285/112, 373, 419, 415, 285/414, 367, 411

[56] References Cited

U.S. PATENT DOCUMENTS

| | | | |
|---|---|---|---|
| 347,461 | 8/1886 | Leprevost-Bourgerel | 285/367 X |
| 1,831,641 | 11/1931 | Skinner | 285/373 X |
| 1,867,891 | 7/1932 | Reynolds | 285/112 X |
| 2,041,132 | 5/1936 | Johnson | 285/112 |
| 2,230,287 | 2/1941 | Curtis | 285/373 X |
| 2,473,102 | 6/1949 | Krooss | 285/112 |
| 2,689,141 | 9/1954 | Kiekhaefer | 285/410 |
| 2,690,193 | 9/1954 | Smith | 285/373 X |
| 2,821,415 | 1/1958 | Race | 285/112 |
| 2,936,186 | 5/1960 | Dunmire | 285/373 |
| 3,153,550 | 10/1964 | Hollett | 285/373 X |
| 3,251,615 | 5/1966 | Short | 285/373 X |
| 3,258,822 | 7/1966 | Schlesch et al. | 285/373 X |
| 3,466,069 | 9/1969 | Hoke et al. | 285/373 X |
| 3,667,782 | 6/1972 | Viazzi | 285/373 X |
| 3,801,141 | 4/1974 | Hollingsworth | 285/373 X |
| 3,966,237 | 6/1976 | Thiessen | 285/112 |

Primary Examiner—Richard J. Scanlan, Jr.
Attorney, Agent, or Firm—Abelman, Frayne, Rezac & Schwab

[57] ABSTRACT

A quick-connect coupling is disclosed for thin-walled pipes which can accommodate pipes of the same internal diameter but of differing wall thickness, the coupling member being constructed to deform pipes of less than maximum wall thickness into a substantially elliptical condition in which the coupling is fully seated, bolting pads of the coupling being spaced from each other to induce deformation and seating of the pipes upon tightening of the coupling.

10 Claims, 10 Drawing Figures

QUICK-CONNECT COUPLING FOR THIN-WALLED PIPES

FIELD OF THE INVENTION

This invention relates to a coupling for pipeline assemblies employed for conveying fluids under pressure, and in particular relates to a coupling known in the art as a quick-connect coupling comprising coupling members of segmented, usually semi-circular configuration which are employed to bridge the mutually presented ends of a pair of pipes in sealing relationship, and secure the pipes against movement relatively to each other.

Such quick-connect couplings are clampingly engaged with the outer periphery of the pipe ends, any convenient arrangement such as bolts and nuts or lever actuated toggles being employed for securing the respectively clamping members to each other, and, for providing the required clamping pressure on the pipes.

In order to provide for sealing of the pipe ends to each other and to prevent leakage or seepage of the pressurized fluid within the pipes in a direction either radially of the pipe ends or axially along the outer periphery thereof, either a single annular gasket member of an elastomeric material is positioned over the pipe ends in bridging relationship therewith prior to the coupling members being applied to the pipe ends, or, the respective coupling members are provided with gasket members of elastomeric material which are supported by the coupling members and which are brought into the required bridging and sealing relationship with the pipe ends upon the positioning of the coupling members over the pipe ends and the securing of the coupling members to each other. In either case, the coupling members are provided with a central groove within which the elastomeric seal is received, the elastomeric seal being held under compression by the coupling members against the outer surface of the pipe ends.

Couplings of the type described above are known from U.S. Pat. Ser. No. 2,041,132, Johnson, issued May 19, 1936, in their utility in securing and sealing to each other the ends of thin-walled pipes formed from a material which is capable of being worked to provide locating members after formation of the pipes. In Johnson, the pipe ends are worked subsequent to the formation of the pipe to provide circumferentially spaced radially extending arcuate projections on each of the adjacent pipe ends, the arcuate projections being received within and held by internal grooves located within and adjacent each axial end of the coupling members. When the coupling members are properly assembled about the pipe ends, the arcuate projections are trapped within the grooves of the coupling members, and provide limited axial movement of the pipes relatively to each other, while restraining them from separation.

BACKGROUND OF THE INVENTION

In numerous industrial applications, such as in food or chemical processing plants, and, in particular wood pulp handling and processing plants and paper manufacturing plants, the need arises to employ pipes formed from a material which is highly resistant to corrosion or etching by the conveyed fluids, and which is non-reactive with the fluid to be conveyed and non-contaminating to that fluid. Stainless steel commonly is employed for this purpose. However, stainless steel is a high cost material requiring economies to be effected in its usage. As a consequence, the wall thickness of the pipes must be kept as small as is possible within the design and operating parameters of the plant, it being uneconomical to employ stainless steel pipes of a maximum wall thickness, except in those circumstances which require maximum wall thickness. Commonly, such pipes formed from stainless steel are of a relatively light gauge and have a wall thickness in the range of 0.078 to 0.109 inches, the range not necessarily being limited to such thickness.

While such selection of minimal wall thickness of the pipes is admirable for the reasons of economy, it tends to preclude the use of quick-connect couplings, in that a quick-connect coupling of specific dimensions must be provided for any specific wall thickness of pipe.

This requirement arises in that the end faces of the coupling members must be brought into face contact with the faces of the opposite coupling member, for otherwise, there will be a gap existing between the mutually presented pairs of end faces which will permit the extrusion or cold flow of the gasket member at the interface of the coupling members, with a consequential loss of sealing pressure exerted on the elastomeric seal and seepage axially of the pipe ends, and, seepage at the radial interface of the gasket members in those instances where the elastomeric seal is other than continuous.

This condition will arise when the outside diameter of a pipe is greater than that for which the coupling was designed. In the event that the outside diameter of the pipe is less than that for which the coupling was designed, then the end faces of the coupling members will come into face contact with each other, but, prior to the required compressive force being developed within the gasket member sufficient to ensure against seepage axially of the elastomeric seal or radially at the interface of the respective ends thereof.

Further, in the event that a coupling is applied to a pipe having an outside diameter which is less than that for which the coupling was designed, and the pipe is of the type having spaced radially extending arcuate projections for interlocking with the coupling, then, the interengagement between the projections and the coupling will be of diminished extent and will reduce the strength of the interconnection.

OBJECT OF THE INVENTION

It is an object of this invention to provide a quick-connect coupling which can be employed universally with pipes of any wall thickness within a determined range, thus eliminating the necessity of providing a coupling of specific dimensions to accommodate any particular wall thickness of pipe within that determined range.

SUMMARY OF THE INVENTION

According to the present invention, instead of being formed from coupling members in which the end faces of each coupling member are coplanar with the axis of generation of the coupling member as in prior known constructions, the end faces of the coupling members are formed for them to be substantially planar and for each said end face to lie in a plane which is parallel to, but spaced from, a radial plane which includes the central longitudinal axis of generation of the coupling bore and which lies beyond the associated end of the coupling member.

Where the coupling member is comprised of two coupling member halves, as is most commonly the case, the respective end faces of each coupling member are coplanar, and the plane of the end faces is spaced from the axis of generation of coupling member half with said axis positioned on that side of said plane which is opposite to the side facing the coupling member half. An extrusion shield in two parts, of flexible but yet somewhat rigid material is provided on the outer face of the elastomeric gasket member, the extrusion shield bridging any gap which may be present between the mutually presented end faces of the coupling members thus maintaining the compressive force exerted on the gasket member and confining the elastomeric seal against extrusion.

As will be apparent later in the discussion of the present invention, the compressive force exerted on the gasket member is maintained at or above a minimum optimum level without regard to the wall thickness of the pipe within a determined range of thicknesses, advantage being taken of the ability of the pipe to flex and deform for it to be of other than truly circular transverse cross-section.

DESCRIPTION OF THE DRAWINGS

The invention will now be described with reference to the accompanying drawings, in which.

Figure 1:
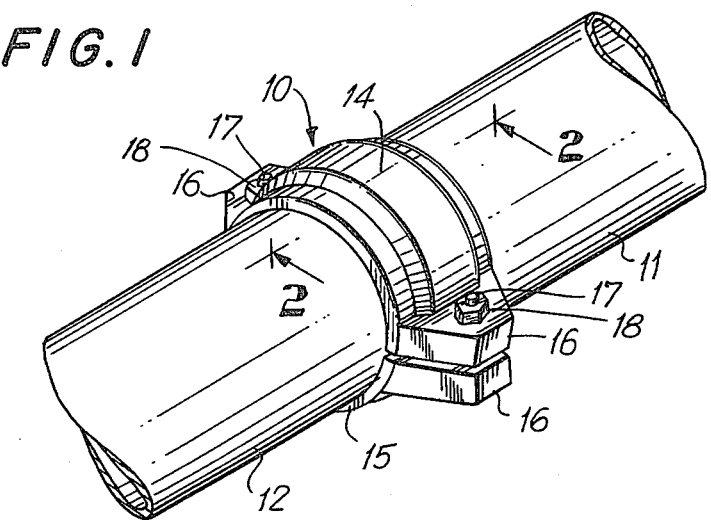
FIG. 1 is a perspective view of a quick-connect coupling according to the present invention applied to the ends of a pair of pipes.
Figure 2:
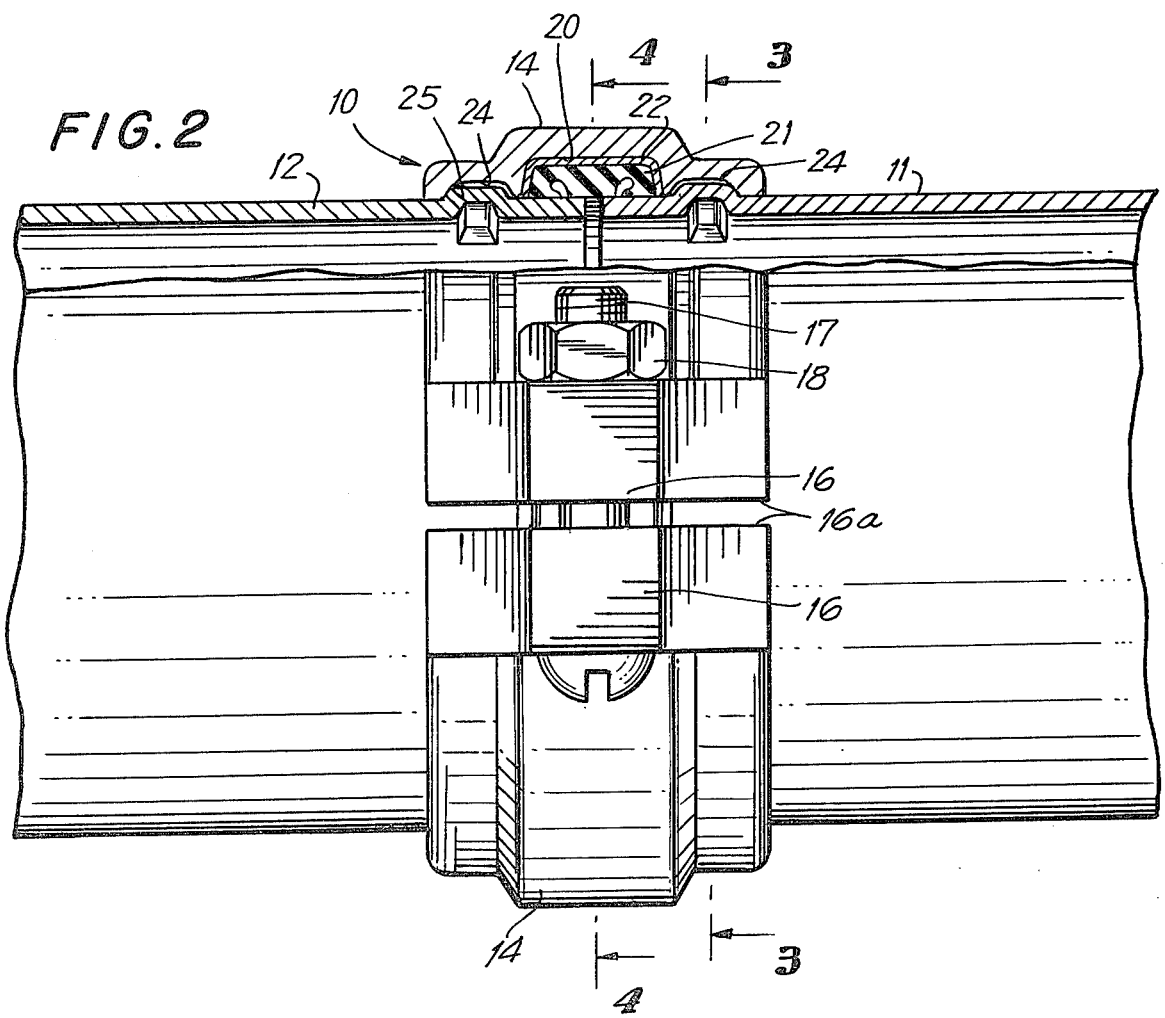
FIG. 2 is a fragmentary cross-section taken along the line 2—2 in FIG. 1.

Referring now to the drawings, the quick-connect coupling of the present invention is indicated generally by the reference numeral 10, the coupling being shown as applied to, and interconnecting the ends of pipes 11 and 12. The coupling is comprised of coupling member halves 14 which are identical with each other in all respects in the case of pipes having an internal diameter which is identical with that of the internal diameter of the other pipe, as is most commonly the case. The present invention does not, however, preclude a step-up or step-down in the internal diameter of the respective pipes.

In relation to the application of the invention as a step-up or step-down coupling, in the practical case it is not necessary that the wall thickness be identical if one is willing to accept some tilting of the coupling and in fact even in pipes of common internal diameter but different wall thicknesses, it has been proven practical to use the coupling, for example, to join a pipe of 0.078" wall to a pipe of 0.109" wall. Further with regard to the abilities of the coupling, it should be recognized that the coupling can also be used to accommodate pipe of a specific wall thickness but with O.D. variations, e.g. due to tolerances lying within the design range of the coupling.

The respective coupling member halves may be formed in any suitable manner, such as by casting or forging, and, may be formed of any suitable material, such as cast or malleable iron or steel. Where conditions warrant, the coupling member halves may be formed from a material identical with that of the pipes, for example, stainless steel. Optionally, the coupling member halves may be formed by injection molding a suitable rigid plastics material, particularly in those instances where electrical continuity between the respective pipes would be disadvantageous.

Each coupling member half includes bolting pads 16 formed integrally therewith, the bolting pads 16 having apertures for the reception of bolts 17. The bolts 17 are received within nuts 18, and act to secure the respective clamping member halves to each other in clamping engagement with the exterior surface of the respective pipes 11 and 12. In a preferred construction, the shanks of the bolts are other than of circular transverse cross-section, and, are received within correspondingly shaped apertures in the bolting pads 16 for the bolts to be held against rotation within the lugs. In this manner, the requirement for two independent wrenches for torquing the bolts is removed, only one such wrench being necessary. Optionally, the bolts may be coach bolts having a neck portion which is rectangular in transverse cross-section, or, the neck portion can be formed of oval or other non-circular transverse cross-section.

Each coupling member half includes a central groove 20 within which is received a sealing gasket 21. The gasket may be formed of any suitable elastomeric material, and, may be of any desired configuration in transverse cross-section, as is well known in the art. The gasket 21 is contained within a retainer 22 of split or segmented construction, the retainer 22 or the respective segments thereof being located for them to bridge any gap which may be present between the respective pairs of bolting pads 16, 16. The retainer 22 has a transverse cross-section complimentary to the outer peripheral contour of the gasket 21 and the contour of the groove 20, and is formed from a substantially rigid but flexible material such as stainless steel or carbon steel, or, where operating conditions permit, a stiff but flexible plastics material. Optionally, the gasket retainers 22 may be of foreshortened dimensions moulded integrally with the gasket and flush with the outer surface of the gasket, two of these being diametrically opposed, this providing the benefit of a unitary sub-assembly and greater convenience in assembly.

Adjacent each axial end of the coupling member halves, the coupling member halves are formed with an internal groove 24 for the reception of arcuate projections 25 formed in the respective pipes 11 and 12, and which extend radially outwardly of the respective pipes and are spaced circumferentially about the periphery thereof. The projections 25, in conjunction with the grooves 24 in the assembled coupling, prevent separation of the pipes under the action of end pull forces and limit axial movement of the pipes with respect to each other.

The construction so far described finds counterpart in U.S. Pat. No. 2,041,132 referred to above, and does not constitute the focal point of the present invention.

Figure 3:
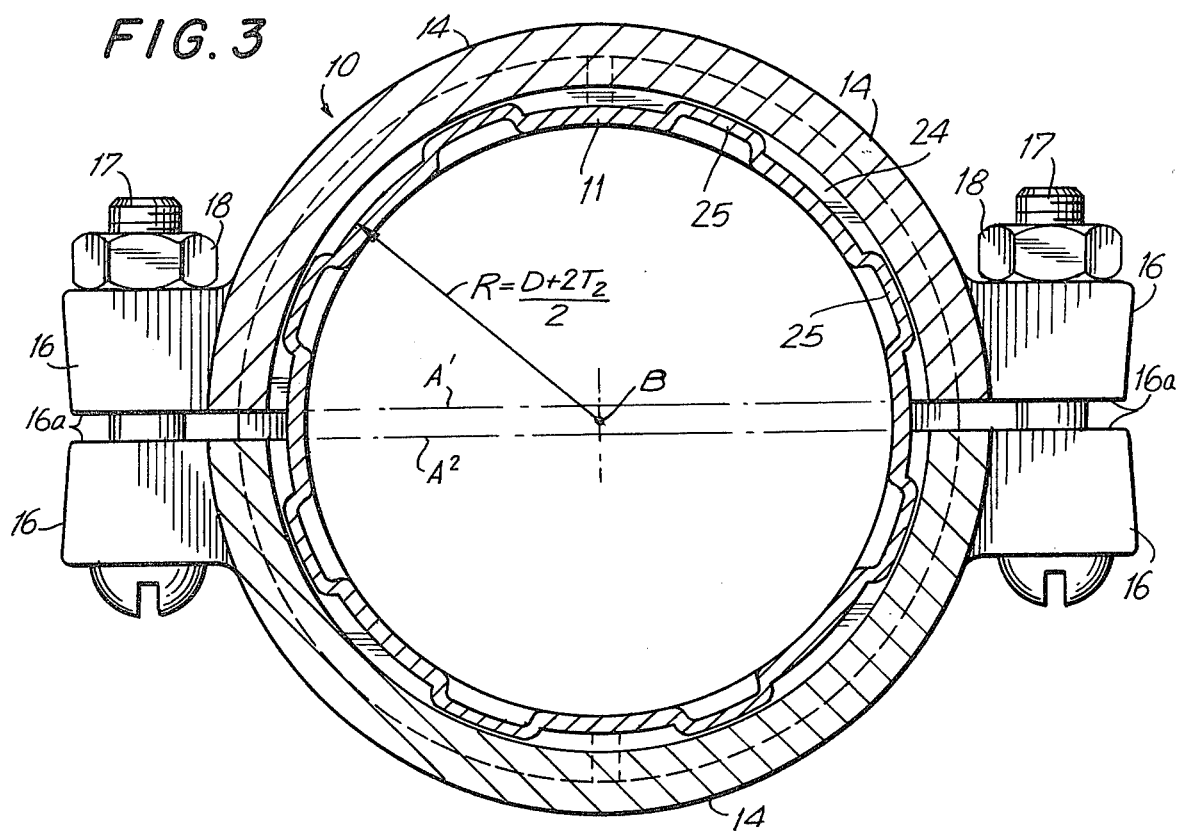
FIG. 3 is a cross-section taken along the line 3—3 in FIG. 2 and showing the coupling of the present invention applied to a pipe having a maximum permissible wall thickness.
Figure 4:
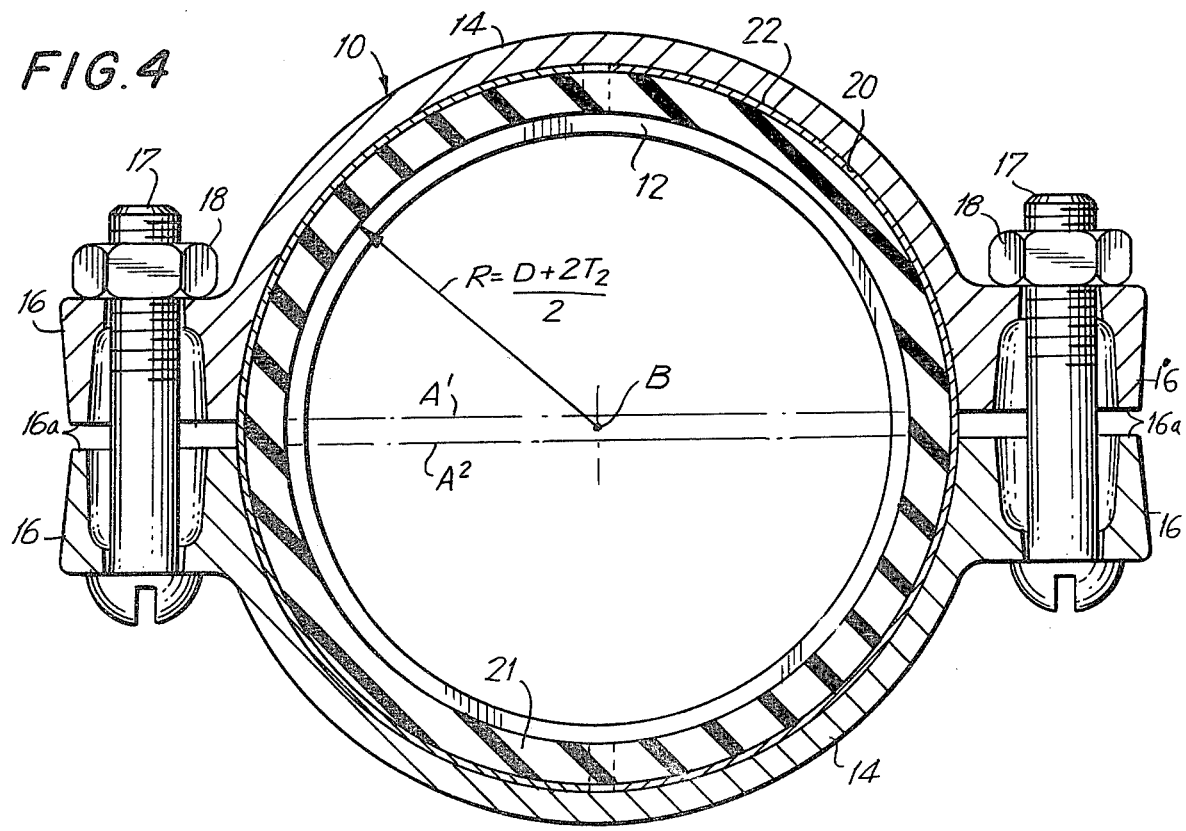
FIG. 4 is a transverse cross-section taken on the line 4—4 in FIG. 2, again showing the coupling of the present invention applied to a pipe having maximum permissible wall thickness.

Referring now more particularly to FIGS. 3 and 4, which illustrates the coupling of the present invention applied to a pipe having maximum permissible wall thickness, it will be noted that the radius of the interior bore of each coupling member half is identical with the radius of the outer surface of the pipe, such that, throughout its entire arcuate extent, the inner periphery of the coupling member is in engagement with the outer surface of the pipe, each of the projections 25 being fully received within its associated groove 24. In this condition, as more clearly illustrated in FIGS. 3 and 4, the end faces 16a of the respective bolting pads 16 of the respective coupling member halves are spaced from each other, the gaps between the respective pairs of end faces 16a, which have been shown exaggerated in the drawings, being bridged by the gasket 21 and the gasket retainer 22. Even in the event that the bolts 17 are torqued fully in order to place the gasket under the required compressive force, extrusion of the gasket through the gaps between end faces 16a is inhibited by the gasket retainer 22, which acts to distribute the compressive forces acting on the sealing gasket 21 equally throughout the entire circumference thereof.

As is clearly illustrated in FIGS. 3 and 4, the end faces 16a of the respective pairs of bolting pads 16 of the respective coupling member halves are coplanar, the plane of the respective pairs of end faces 16a being indicated by the chain-dotted lines A1 and A2.

In FIGS. 3 and 4, which illustrate the coupling of the present invention as applied to a pipe of maximum wall thickness within a determined range of thicknesses, each of the coupling member halves 14 is in continuous engagement at its inner periphery with the outer peripheral wall of the associate pipes. Under these conditions, each of the arcuate projections 25 is fully received within its associated groove 24, such that maximum restraint is imposed on movement of the respective pipes axially relatively to each other, or, angularly relative to each other. Further, in view of the continuous engagement of the inner periphery of the coupling members with the outer wall of the pipe, distortion of the pipe from its truly circular condition does not occur.

Continuous engagement of the inner periphery of the coupling member halves with the outer wall of the pipe is ensured by arranging for the radius R of the inner periphery of the clamping member halves to be identical with the radius of the outer periphery of pipes having maximum wall thickness, the radius of the inner periphery of the respective coupling member halves and that of the outer wall of the tube being taken from a common longitudinal axis of generation indicated at B. It will be noted that the longitudinal axis of generation B is located intermediate and mid-way between the planes A1 and A2 of the end faces 16a of the bolting pads 16.

Figure 5A:
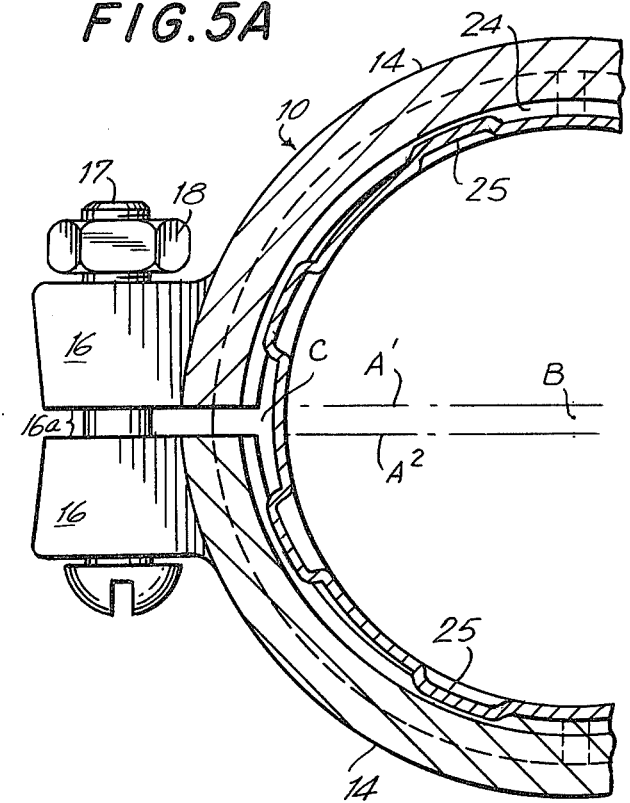
FIGS. 5A and 5B are transverse cross-sections corresponding with FIG. 3, but showing the coupling of the present invention applied to a pipe having minimum wall thickness, FIG. 5A showing the coupling assembled about the pipe end but prior to torquing of the bolts, and FIG. 5B showing the coupling assembled about the pipe end and subsequent to the torquing of the bolts.
Figure 5B:
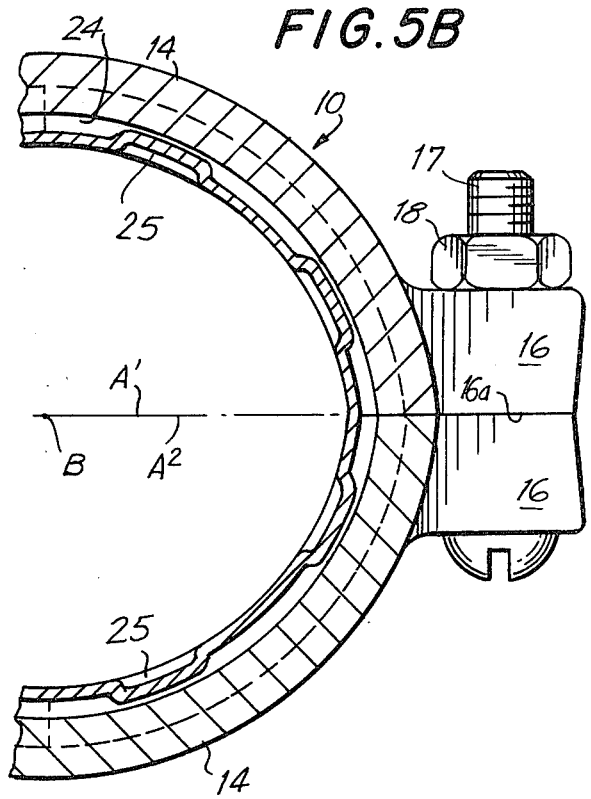
Figure 6:
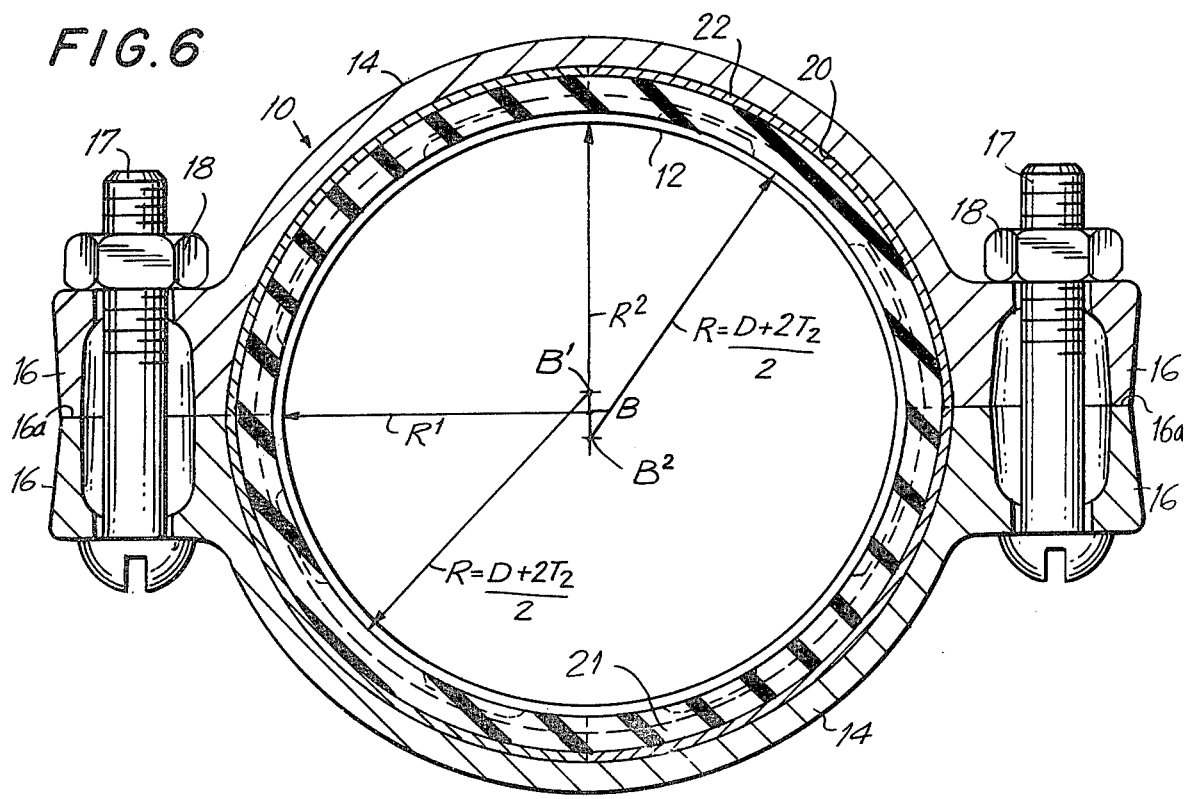
FIG. 6 is a transverse cross-section corresponding with FIG. 4, showing the coupling of the present invention applied to a pipe of minimal wall thickness.

Referring now to FIGS. 5A, 5B and 6, which illustrate the coupling of the present invention when used in association with pipes having a minimum wall thickness, it is firstly to be observed that the coupling member halves 14, the gasket 21 and the gasket retainer 22 are identical in all respects with and are in fact the same as those employed in the embodiment of FIGS. 3 and 4, the sole difference in FIGS. 5A, 5B and 6 being that the pipes to be connected are of lesser wall thickness than the ones illustrated in FIGS. 3 and 4, the internal diameter of the pipes being identical.

Referring more particularly to FIG. 5A, which shows the assembly prior to the application of torque to the bolts, the respective coupling member halves rest on the outer wall of the pipe, which at that time is truly circular in transverse cross-section, contact between the inner periphery of the coupling members 14 and the respective pipes occuring at positions intermediate and substantially mid-way between the respective ends of the coupling members. Under these conditions, and having regard to the lesser outside diameter of the pipe, the arcuate projections 25 do not engage fully within the respective grooves 24, and, the respective members only engage the respective pipes in line engagement.

If, as in a conventional quick-connect coupling, the end faces 16a of the bolting pads 16 were at this time in face engagement with each other, then, two entirely disadvantageous conditions arise. Firstly, restraint on relative axial or angular movement of the pipes is reduced or impaired owing to the incomplete engagement of the arcuate projections within their associated grooves, and secondly, there is a crescent-shaped gap indicated at C between the outer periphery of the pipes and the respective coupling member halves, which will result in incomplete seating of the inner periphery of the coupling member halves on the outer periphery of the pipe, and, will result in the compressive stress exerted on the gasket member being of progressively decreasing intensity from the mid-point of the respective coupling members towards the ends thereof. This will or can result in incomplete sealing of the pipes by the coupling, with consequential seepage axially of the outer periphery of the pipe, and, in the case where split gaskets are employed, also can result in seepage at the radial interface of the respective gasket members.

These problems are obviated in their entirety according to the present application, by arranging for the end faces 16a of the respective bolts pads 16 to be spaced from each other prior to and during torquing of the bolts, with the results which will now be discussed with reference to FIG. 5B.

Upon torquing of the bolts, the respective coupling member halves, which already are in line engagement with the outer surface of the pipe at a point mid-way between their ends, will exert a radially inward force on the pipes at those positions, and will stress the pipes causing them to deform from a truly circular transverse cross-section to a transverse cross-section which is substantially elliptical, the major axis of the ellipse lying in a plane coincident with or parallel to the respective planes A1 and A2 of the ends faces of 16a of the respective bolting pads.

In distorting or deforming to sustantially elliptical configuration, the radius R1 along the major axis of the ellipse will progressively increase, and, the radius R2 along the minor axis will progressively decrease, thus forcing the entire outer periphery of the pipes into intimate sealing engagement with the inner periphery of the coupling members 14, and, thus forcing the arcuate projections 25 into full seating engagement within their associated grooves 24. Further, as the bolts are progressively torqued the pipes will progressively assume a shape in which they are in continuous engagement with the gasket, and, in which the compressive stresses in the gasket are equalized throughout the entire circumference thereof. In this way, the problem of seepage either axially of the outer periphery of the pipes, or radially through the interface of the gasket members where a split gasket is employed, is eliminated in its entirety.

It will be appreciated that in finally assembled condition of the coupling, the transverse cross-section of the respective pipes will deviate slightly from an elliptical condition, the cross-section being theoretically that of two overlapping semicircular segments which intersect each other at the plane of the respective bolting pads, which, at that time are coincident with the centroid B of the pipes. The original longitudinal axis of generation B of the respective coupling member halves now lie above and below the centre of the pipes as shown in FIG. 6 at points B1 and B2.

For pipes of a wall thickness intermediate the minimal wall thickness illustrated in FIGS. 5A, 5B and 6 and the maximum wall thickness illustrated in FIGS. 3 and 4, continuous engagement of the outer surface of the pipes with both the coupling member halves and the gasket member will occur and full seating and sealing will be obtained, the sole difference being that, with a progressive increase in wall thickness of the pipes, a progressively increasing gap will occur between the respective pairs of end faces 16A of the bolting pads 16.

The advantages accruing from the present invention stem from determined dimensional relationships between the coupling members and the range of wall thickness of the pipes to be accommodated by said coupling members.

As will be readily apparent, in order to obtain continuous seating of the coupling member halves relatively to a pipe having maximum wall thickness, then, the radius of the inner periphery of the respective coupling members must be identical with the radius of the outer surface of the pipe.

If one assumes a range of pipes having the same internal diameter D, and having a minimum thickness T1 and a maximum thickness T2, then, the radius R of the inner periphery of the respective coupling member halves must be $$\frac{D + 2(T2)}{2}.$$

On the other hand, in order to accommodate pipes of a wall thickness at the minimum end of the range, the combined lengths of the inner periphery of the coupling member halves must not be more than the length of the circumference of the outer surface of such pipes of minimum wall thickness. This relationship can be expressed as $\pi(D+2T1)$.

This relationship is critical, in that if the combined lengths of the inner peripheral walls of the coupling members is greater than the length of the circumference of the exterior surface of a pipe minimum wall thickness, then, the end faces 16a will engage each other prematurely and prevent further elliptical deformation of the pipe prior to reaching the required seating and sealing of the external periphery of the pipe relatively to the clamping members and the gasket.

While there has been described a coupling comprised by coupling member halves, it will be fully appreciated that for certain applications the coupling members could be comprised by more than two coupling members, for example, three coupling members with the bolting pads arranged in Y arrangement. Provided that each such coupling member is formed with its inner periphery of a radius identical with the radius of the outer surface of a pipe of maximum wall thickness, and, provided that the combined lengths of the inner periphery of the respective coupling members does not exceed the circumferential length of the outside surface of a pipe of minimum wall thickness, then, exactly the same desirable conditions will be obtained as those discussed above with respect to a two-part coupling. The only difference will be that the cross-section of the tube will be deformed or displaced into three segments instead of two, each of which will seat fully on the inner periphery of the assembled coupling, with full engagement of the arcuate projections 25 within the grooves 24, full engagement of the respective coupling members with the outer periphery of the pipes, and, full seating of the contained gasket member with the outer periphery of the pipes and equalization of the compressive stresses exerted on the gasket member.

It will be appreciated that the structures illustrated in the drawings are by way of example only, and, that various modifications may be made within the scope of the invention as defined by the appended claims.

In particular, while the invention has been described in relationship to thin-walled pipes which have been provided with radially outwardly extending arcuate projections, the coupling could also be used with plain-ended pipes devoid of such arcuate projections in those situations where relative axial movement between the pipes cannot occur. Optionally, clamping jaws having incisor teeth could be incorporated into the grooves of the coupling members, or, the coupling members themselves could be formed with incisor teeth to provide an additional grip on plain-ended pipes. Alternatively, the pipes could be inwardly dimpled at circumferentially spaced positions and the coupling members provided with corresponding dogs or teeth for entry into such dimples, the major consideration being that the formation of the pipes with either arcuate radially outwardly extending projections or arcuate radially inwarding extending dimples shall not interfere materially with the capability of the pipes to distort or deform from their truly circular condition to a condition of plural or multiple segments each having an outer radius which is that of the radius of the outer surface of a pipe having maximum wall thickness.

Further, while the invention has been described with reference to a double-ended coupling for connecting the adjacent ends of a pair of pipes to each other, the invention has equal application in a flanged, single-ended coupling employed for connecting a pipe end to an adjacent structure.

Figure 7:
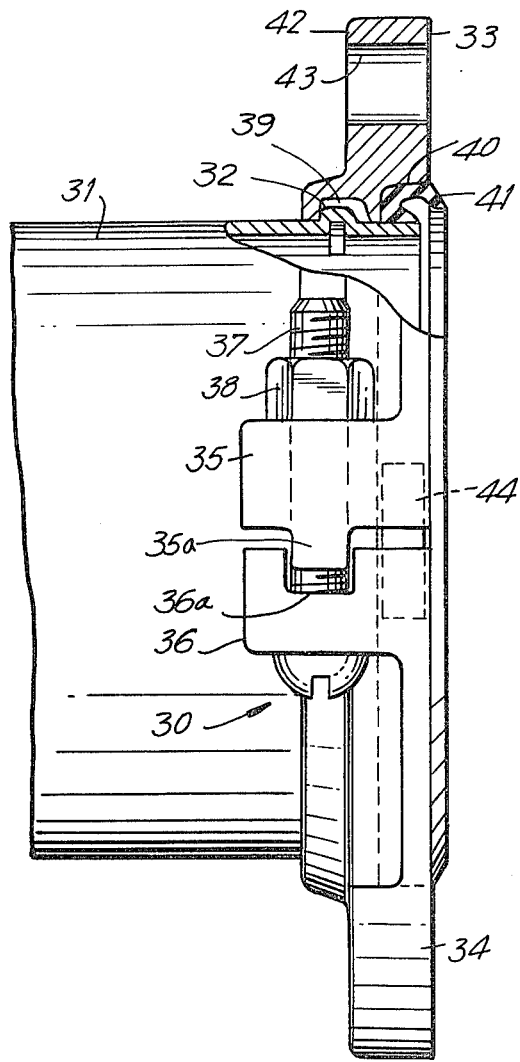
FIG. 7 is a fragmentary cross-section similar to FIG. 2, but illustrating a flanged quick-connect coupling according to the present invention applied to the end of a single pipe.

FIG. 7 illustrates such a flanged coupling, the coupling incorporating all of the design parameters set out above with respect to the coupling of FIGS. 1 through 6, the major differences being in the adaptation of the coupling of FIGS. 1 through 6 to the form of a flanged coupling.

In FIG. 7, the coupling member, indicated generally at 30, is shown applied to the end of a pipe 31 having spaced radially extending arcuate projections 32 adjacent the free end thereof.

In an identical manner to that described above with reference to the coupling of FIGS. 1 through 6, the flanged coupling 30 of FIG. 7 includes coupling member halves 33 and 34 having radially extending bolting pads 35 and 36, which are secured to each other by bolts 37 and torqueing nuts 38, as previously described, in clamping engagement with the exterior surface of the pipe 31.

Each of the coupling member halves 33 and 34 includes a groove 39 for the reception of radially extending arcuate projections 32 formed adjacent the end of the pipe 31, again, in the same manner as that discussed above with respect to FIGS. 1 through 6, and, each of the coupling member halves 33 and 34 includes a recess 40 in which is received a gasket member 41 which is formed from any suitable elastomeric material.

The respective coupling member halves each include a radially extending flange 42 having bolt holes 43 at circumferentially spaced positions, whereby the flanges may be attached to an adjacent structure having a planar face, or, whereby the flanges may be attached to the flanges of a similar or identical coupling attached to the end of another pipe, the said other pipe either being identical in dimensions with the pipe 31, or, differing therefrom in respect of its internal radius or wall thickness.

Conveniently, and as illustrated, the bolts pads 35 are provided with a rectangular key 35a which is received within a rectangular keyway 36a in the bolting pads 36. The provisions of the key and keyway acts to stabilize the respective coupling member halves on the end of the pipe during the assembly of the coupling onto the pipe end, and, further acts to ensure that the planar end faces of the coupling member halves are brought into co-planar relationship with each other prior to the flanges being attached to the said adjacent structure.

In order not to interfere with the design parameters of the coupling, the keys 35a are of a height no greater than the depth of the keyways 36a, the keys 35a preferably being of lesser height than the depth of the keyways 36a. Additionally, the bolt holes 43 either are formed oversized in relationship to the bolts which extend therethrough, or, they are formed elongate in a direction radially of the longitudinal axis of the pipe and coupling. In this way, radially outward or radially inward movements of the coupling member halves which are required in order to accomodate pipes of different wall thickness can be accomodated without the necessity of repositioning the bolt holes in the structure to which the coupling and pipe is to be attached.

Figure 8:
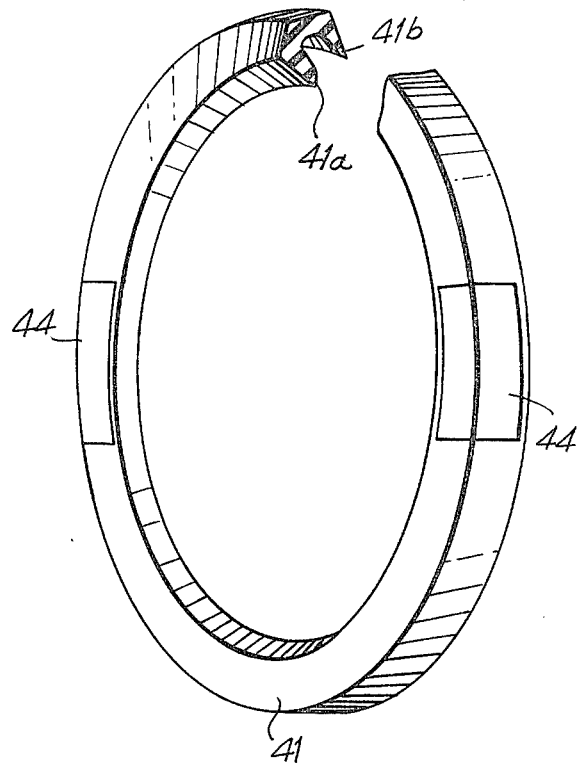
FIG. 8 is a fragmentary perspective view of the sealing gasket employed in the flanged coupling of FIG. 7; and, FIG. 9 is a fragmentary perspective view of an alternative form of sealing gasket for use in the quick-connect coupling of any one of FIGS. 1 through 6.

Referring now to FIG. 8, which illustrates in greater detail the gasket employed in the embodiment of FIG. 7, the gasket includes a generally axially extending lip seal 41a for engagement with the outer periphery of the pipe, and includes a generally radially extending lip seal 41b for sealing engagement with the said adjacent structure to which the coupling is attached.

Conveniently, and as illustrated in FIG. 8, instead of being contained within a substantially continuous retainer or extrusion shield as described with reference to FIGS. 1 through 6, extrusion shields 44 are provided as an integral part of the gasket 41, the extrusion shields 44 being placed in a mold prior to the molding of the gasket, and thus being located in situ in the finished gasket. The provision of the extrusion shields 44 as an integral part of the gasket greatly facilitates handling of the gasket at the point of assembly at the coupling, and, eliminates the requirement for a separate extrusion shield or retainer. In use, the gasket is placed on the end of the pipe, and, is then rotated to a position at which it will span the adjacent ends of the respective coupling member halves, subsequent to which the bolts are torqued down to fully assemble the coupling onto the pipe end.

Figure 9:
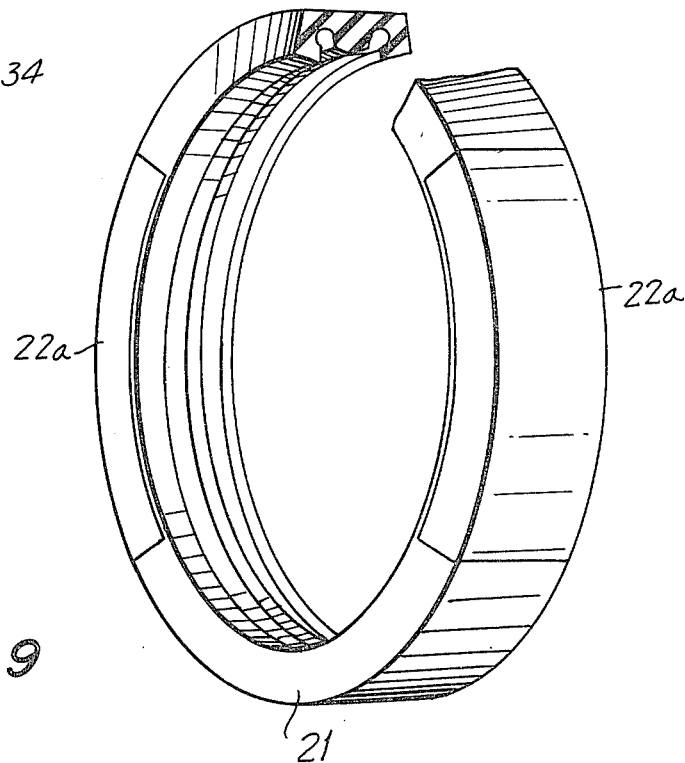

Referring now to FIG. 9, the same modification as is discussed above with respect to FIG. 8 is shown as applied to the sealing gasket 21 of FIGS. 1 through 6. In FIG. 9, respective segments 22a of the retainer are located at diametrically opposed positions within the mold employed for forming the sealing gasket 21, and thus become an integral part of the gasket during the molding process.

Preferably, the respective retainer segments 22a and 44 are either formed for them to be reflective, or, are formed or otherwise colored for them to be clearly distinguishable from the body of the sealing gasket 21. By so doing, the position of the retainers easily can be observed by an operative assembly the coupling, who will be given a visual indication that the retainers are correctly positioned relatively to the adjacent faces of the respective pairs of bolting pads, in the manner indicated in chain-dotted lines in FIG. 7.

What is claimed:
1. A quick-connect coupling for thin-walled pipes of resiliently deformable cross-section, said coupling comprising:
plural arcuate coupling members each having a radial internal groove for the reception of an elastomeric gasket;
a radially outwardly extending pad at each circumferential end of each said coupling member, each said radially extending pad being adapted to receive securing means for securing said coupling members to each other in clamping engagement with said pipes;
each said radially extending pad having an end face which, in the assembled condition of the coupling, is spaced from and extends substantially parallel to a plane which includes the central longitudinal axis of said coupling member and which lies beyond the associated end of said coupling member; and, internal grooves at each axial end of said coupling members for the reception of arcuate projections on the outer periphery of the respective pipes.

2. A quick-connect coupling as claimed in claim 1 for use with thin-walled pipe the thickness of the wall thereof falls within the range of a minimum thickness T1 and a maximum thickness T2, in which the curvature of the inner peripheral wall of the coupling member is of a radius, $$\frac{D + 2(T2)}{2},$$

where D is the internal diameter of the pipe, and, the combined lengths of the inner peripheral walls of all of the coupling members comprising said coupling is not more than $\pi(D+2T1)$.

3. The quick-connect coupling of claim 1, further comprising arcuate coupling member halves constituting said coupling members each having an internal groove for the reception of an elastomeric gasket; said radially extended pads of each said coupling member half having end faces which lie generally in a single plane which is spaced from the central axis of said coupling member, said axis lying on that side of said plane which is opposite to the side facing said coupling member half.

4. The quick-connect coupling according to claim 3 further comprising grooves at each axial end of said coupling member halves for the reception of arcuate projections on the outer periphery of the respective pipes.

5. A quick-connect coupling for thin-walled pipes of resiliently deformable cross-section, said coupling comprising:
- plural arcuate coupling members each having an internal groove;
- an elastomeric gasket member positioned within said groove;
- a radially outwardly extending pad at each circumferential end of each said coupling member;
- means securing respective adjacently positioned pairs of pads to each other and securing said coupling members in clamping engagement with said pipes;
- each said radially extended pad having an end face spaced from and extending substantially parallel to a plane including the central longitudinal axis of said coupling member and which lies beyond the associated end of said coupling member; and,
- grooves at each axial end of said coupling members for the reception of arcuate projections on the outer periphery of the respective pipes.

6. The quick-connect coupling of claim 5, further comprising a rigid retainer surrounding said elastomeric gasket member and which spans any existing gap between each adjacent pair of end faces of said radially outwardly extending pads.

7. A quick-connect coupling as claimed in claim 5 for use with thin-walled pipe the thickness of the wall thereof falls within the range of a minimum thickness T1 and a maximum thickness T2, in which the curvature of the inner peripheral wall of the coupling member is of a radius, $$\frac{D + 2(T2)}{2},$$

where D in the internal diameter of the pipe, and, the combined lengths of the inner peripheral walls of all of the coupling members comprising said coupling is not more than $\pi(D+2T1)$.

8. A quick-connect coupling for thin-walled pipes of resiliently deformable cross-section, said coupling comprising:
- arcuate coupling member halves, each having an internal groove;
- an elastomeric gasket member received within said internal groove;
- a radially outwardly extending pad at each circumferential end of said coupling member half; securing means securing adjacent radially extending pads to each other and securing said coupling members in clamping engagement with said pipes;
- said radially extending pads of each coupling member half having end faces which lie generally in a single plane which is spaced from the central axis of said coupling member half, said axis lying on that side of said plane which is opposite to the side of said plane facing said coupling member half; and,
- grooves at each axial end of said coupling member halves for the reception of arcuate projections on the outer periphery of the respective pipes.

9. The quick-connect coupling of claim 8, further comprising a rigid retainer surrounding said elastomeric gasket member and which spans any existing gap between each adjacent pair of end faces of said radially outwardly extending pads.

10. A quick-connect coupling as claimed in claim 8 for use with thin-walled pipe the thickness of the wall thereof falls within the range of a minimum thickness T1 and a maximum thickness T2, in which the curvature of the inner peripheral wall of the coupling member is of a radius, $$\frac{D + 2(T2)}{2},$$

where D is the internal diameter of the pipe, and, the combined lengths of the inner peripheral walls of all of the coupling members comprising said coupling is not more than $\pi(D+2T1)$.

* * * * *